US012507786B2

(12) United States Patent
Kutsuna et al.

(10) Patent No.: US 12,507,786 B2
(45) Date of Patent: Dec. 30, 2025

(54) BACKPACK ASSEMBLY (71) Applicant: Makita Corporation, Anjo (JP)

(72) Inventors: Tomoyuki Kutsuna, Anjo (JP); Mikihiro Kitahara, Anjo (JP); Tatsuya Hata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 45 days.

(21) Appl. No.: 18/638,226

(22) Filed: Apr. 17, 2024

(65) Prior Publication Data

US 2024/0349875 A1 Oct. 24, 2024

(30) Foreign Application Priority Data

Apr. 19, 2023 (JP) .................. 2023-068645

(51) Int. Cl.
*A45F 3/04* (2006.01)
*A45F 3/08* (2006.01)
*H01M 50/244* (2021.01)
*H01M 50/256* (2021.01)

(52) U.S. Cl.
CPC ............. *A45F 3/08* (2013.01); *H01M 50/244* (2021.01); *H01M 50/256* (2021.01); *A45F 2003/045* (2013.01)

(58) Field of Classification Search
CPC ........ A45F 2003/122; A45F 3/04; A45F 3/08; A45F 3/14; A45F 3/047; A45F 3/02; A45F 3/10; A45C 13/30
See application file for complete search history.

(56) References Cited

U.S. PATENT DOCUMENTS 10,998,596 B2 * 5/2021 Zhang ................. H01M 50/213
2021/0212444 A1 * 7/2021 Lee ...................... A47D 13/027

FOREIGN PATENT DOCUMENTS

JP 2021-128860 A 9/2021

* cited by examiner

Primary Examiner — Adam J Waggenspack
(74) Attorney, Agent, or Firm — Sughrue Mion, PLLC (57) ABSTRACT A backpack assembly may include a backplate extending in an up-down direction; an elastic member fixed on the backplate and configured to stretch in the up-down direction; and a shoulder belt including an accommodating part. The accommodating part may include an opening for inserting the elastic member and accommodate a portion of the elastic member.

8 Claims, 7 Drawing Sheets

BACKPACK ASSEMBLY

REFERENCE TO RELATED APPLICATION

This application claims priority from Japanese Patent Application No. 2023-068645 filed on Apr. 19, 2023. The entire content of the priority application is incorporated herein by reference.

BACKGROUND ART

Japanese Patent Application Publication No. 2021-128860 describes a backpack assembly including a backplate extending in an up-down direction and a shoulder belt.

SUMMARY

In the backpack assembly in Japanese Patent Application Publication No. 2021-128860, in a state where the backpack assembly is worn by a user on his/her back (worn on a user's back), the shoulder belt hung on shoulders of the user is displaced rearward, as a result of which an upper portion of the backplate separates from his/her back. In this case, a greater force is then exerted on a front portion (near collarbone) of the user's shoulders as compared to when the upper portion of the backplate is in contact with the user's back. Working in this state will cause a burden on the user.

The present disclosure provides an art configured to reduce burden on a user when he/she wears a backpack assembly on his/her back.

The disclosure discloses a backpack assembly. The backpack assembly may comprise: a backplate extending in an up-down direction; an elastic member fixed on the backplate and configured to stretch in the up-down direction; and a shoulder belt including an accommodating part. The accommodating part may include an opening for inserting the elastic member and accommodates a portion of the elastic member.

In the above-identified backpack assembly, when the backpack assembly is worn by the user on his/her back (worn on the user's back), the shoulder belt bends along the shoulders of the user, and also an upper portion of the backplate enters a state of being pulled toward the back of the user. In this case, the backplate is maintained in a state in close contact with the user's back. Due to this, a situation in which the upper portion of the backplate separates from the user's back and thereby a great force is borne on the front portions of the user's shoulders can be suppressed from occurring. Accordingly, burden on a user when he/she is wearing a backpack assembly can be reduced.

DESCRIPTION

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide an improved backpack assembly, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a backpack assembly may comprise: a backplate extending in an up-down direction; an elastic member fixed on the backplate and configured to stretch in the up-down direction; and a shoulder belt including an accommodating part. The accommodating part may include an opening for inserting the elastic member and accommodates a portion of the elastic member.

In one or more embodiment, the accommodating part may include an upper-side cover and a lower-side cover. The accommodating part may be defined by the upper-side cover being coupled with the lower-side cover at a first end in a width direction of the accommodating part and a second end in the width direction of the accommodating part, wherein the second end is disposed opposite to the first end. The accommodating part may further comprise a coupling part coupling the upper-side cover and the lower-side cover at a third end closer to the opening of the accommodating part. The coupling part may be disposed between the first end and the second end. The elastic member may be disposed between the first end and the coupling part or between the second end and the coupling part.

According to the above configuration, a size of the opening in the width direction can be made small as compared to a configuration in which the accommodating part does not have the coupling part. By making the size of the opening in the width direction smaller, the elastic member can be suppressed from slipping out from the shoulder belt.

In one or more embodiments, the accommodating part may include an upper-side cover and a lower-side cover. The accommodating part may be defined by the upper-side cover being coupled with the lower-side cover at a first end in a width direction of the accommodating part and a second end in the width direction of the accommodating part. The second end may be disposed opposite to the first end. The upper-side cover may be constituted of a double-layered cover.

When the backpack assembly is worn on the back by the user, the shoulder belt and the elastic member bend along the shoulders of the user. In such a state, a restoring force of the elastic member is borne on the upper-side cover. According to the above configuration, durability of the upper-side cover can be improved.

In one or more embodiments, the accommodating part may include an upper-side cover and a lower-side cover. The accommodating part may be defined by the upper-side cover being coupled with the lower-side cover at a first end in a width direction of the accommodating part, a second end in the width direction of the accommodating part, and a fourth end opposite to a third end closer to the opening of the accommodating part. The second end may be disposed opposite to the first end.

According to the above configuration, as compared to a configuration that the upper-side cover is not coupled to the lower-side cover at the fourth end, the upper portion of the backplate enters a state of being pulled toward the back of the user at a greater degree. Accordingly, burden on the user when wearing the backpack assembly on the back can be reduced at a greater degree.

In one or more embodiments, the backplate and the elastic member may be constituted of different materials.

According to the above configuration, the backplate can be constituted of a material having higher rigidity than the elastic member. Due to this, rigidity of the backplate can be improved.

In one or more embodiments, a backpack-type device may be detachably attached to the backplate. The backpack-type device may be a backpack-type power supply.

The backpack-type power supply is heavy. Due to this, a force borne on the front portions of the user's shoulders is relatively great. According to the above configuration, an advantage can be achieved in suppressing a great force from being borne on the front portions of the user's shoulders.

(Embodiment)

Figure 1:
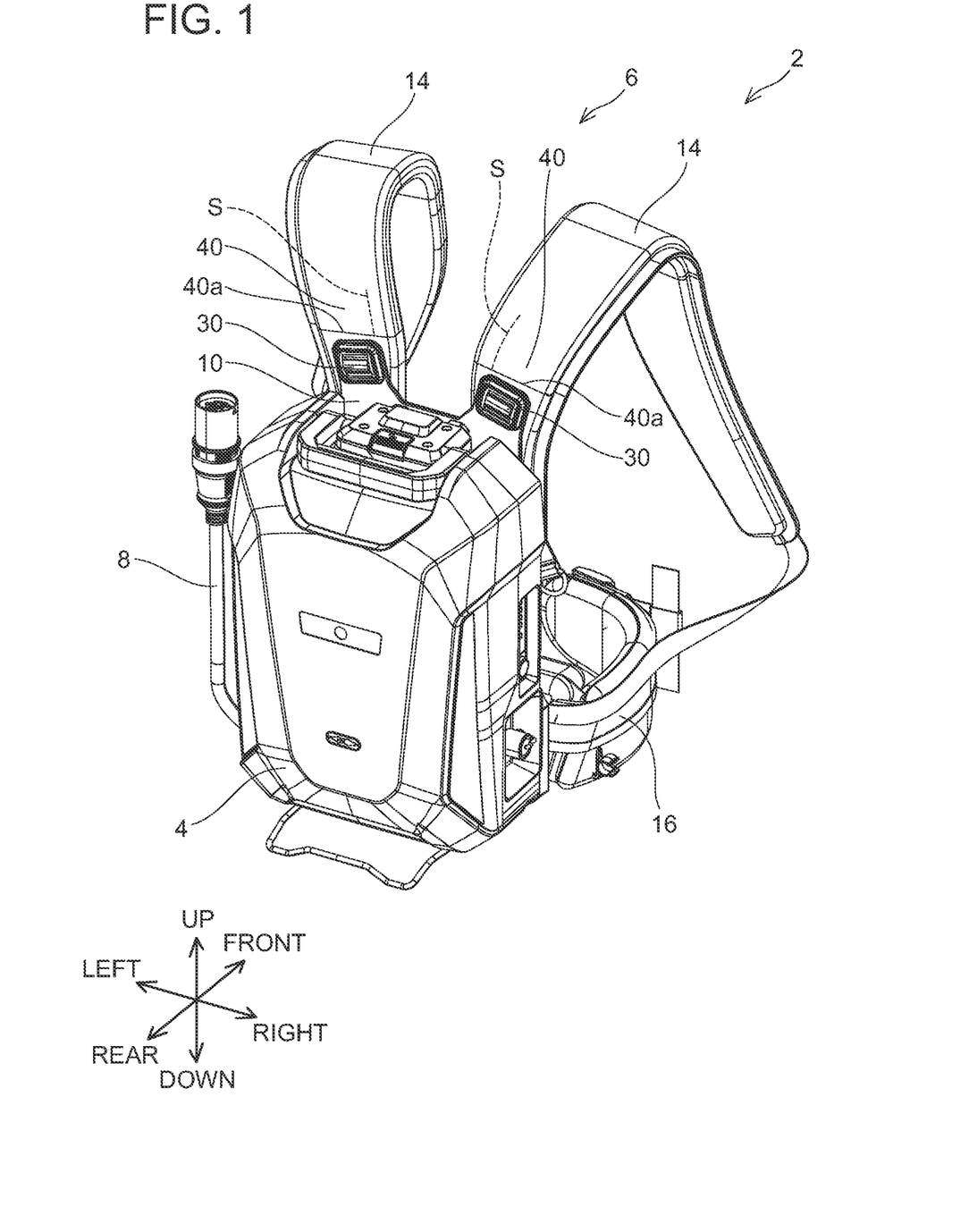
FIG. 1 illustrates a perspective view of a work apparatus 2 according to an embodiment as seen from a rear right upper side.

As shown in FIG. 1, a work apparatus 2 comprises a backpack-type device 4 and a backpack assembly 6. The backpack-type device 4 is removably attached to the backpack assembly 6. In the present embodiment, the backpack-type device 4 is a backpack-type power supply. Weight of the backpack-type device 4 is 5 kg to 20 kg. The backpack-type device 4 is a rechargeable/dischargeable secondary battery, for example. The backpack-type device 4 is supplied with charge power from an external power source (not shown) connected to the backpack-type device 4. The backpack-type device 4 is connected via a connection cable 8 to another electric work machine (not shown) having a motor, and supplies its discharge power to the motor. A user can use the electric work machine for many hours with the backpack-type device 4. Hereafter, a front-rear direction, a left-right direction, and an up-down direction while the user is standing upright with the work apparatus 2 worn on the user's back will be referred to as front-rear direction, a left-right direction, and an up-down direction of the work apparatus 2.

Figure 2:
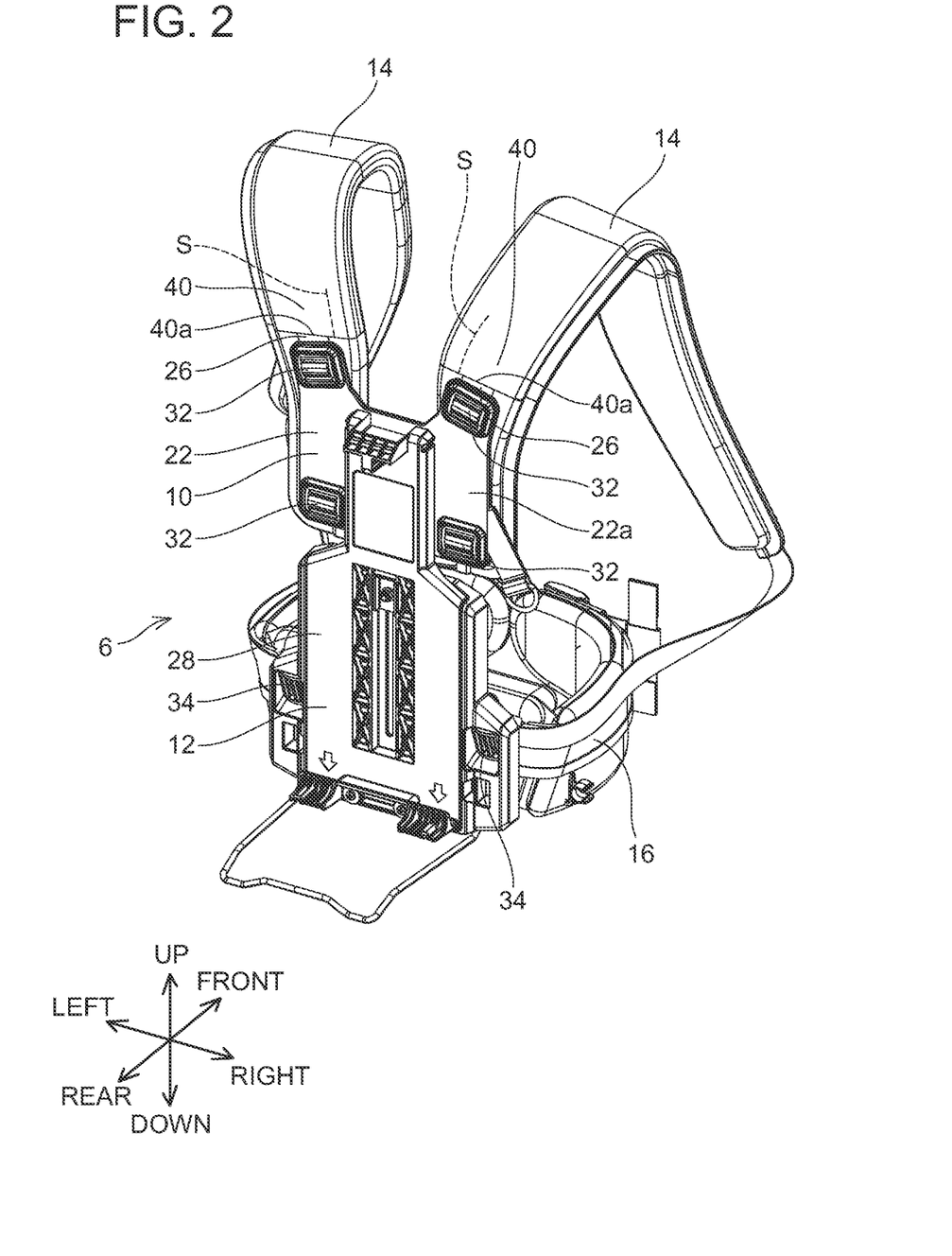
FIG. 2 illustrates a perspective view of a backpack assembly 6 according to the embodiment as seen from the rear right upper side.

As shown in FIG. 2, the backpack assembly 6 comprises a mount plate 10, a backplate 12, a pair of left and right shoulder belts 14, and a waist belt 16. The mount plate 10 and the backplate 12 face a back of a user when the user wears the backpack assembly 6 on his/her back. The mount plate 10 is constituted of an elastic material and for example constituted of a resin material such as high-density polyethylene (HDPE). The backplate 12 is constituted of a metal material.

Figure 3:
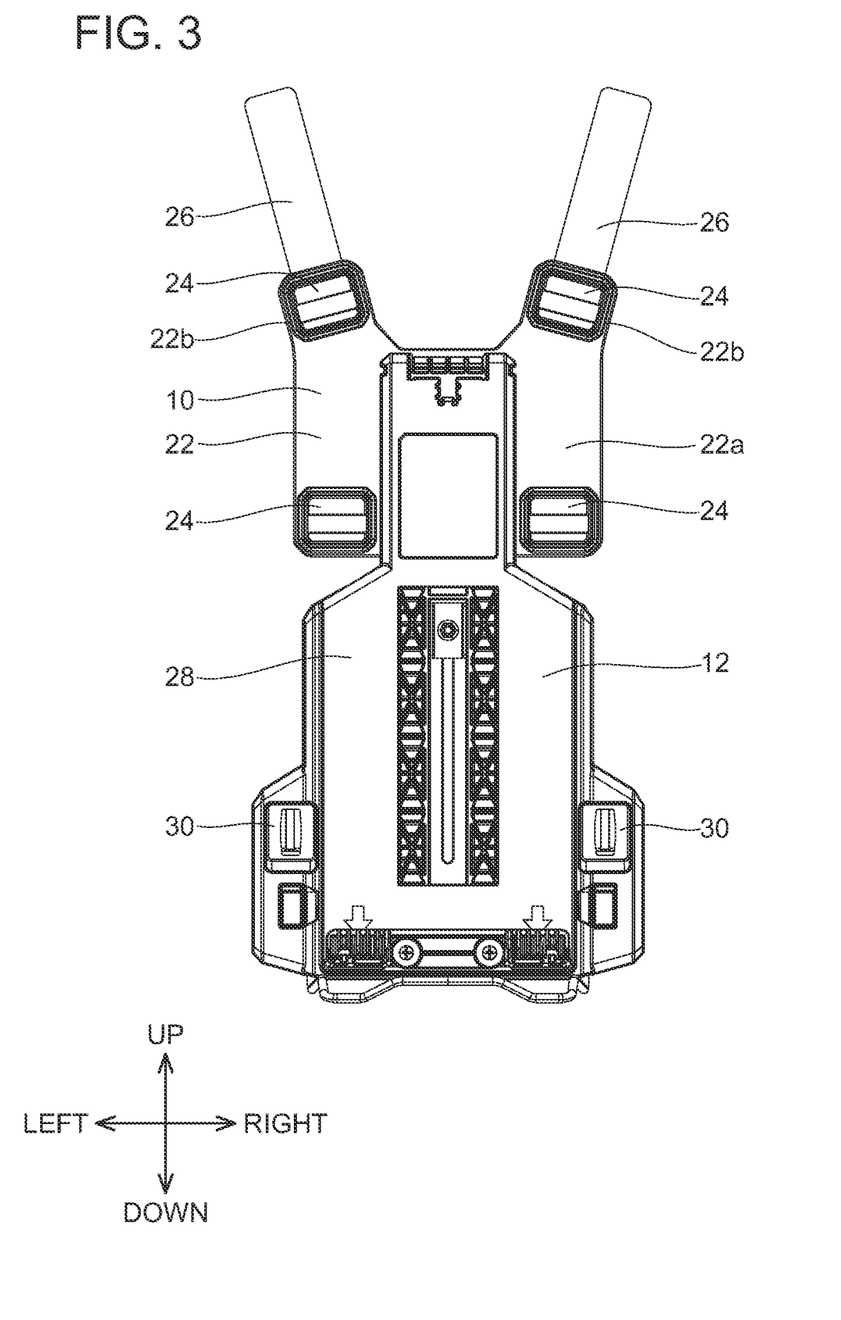
FIG. 3 illustrates a rear view of a mount plate 10 and a backplate 12 according to the embodiment.

The mount plate 10 is fixed to a front surface of the backplate 12 at an upper portion of the backplate 12. As shown in FIG. 3, the mount plate 10 comprises a base part 22, four buckle receptacles 24, and assisting parts 26. The base part 22 has a flat plate part 22a and two protruding parts 22b. The left protruding part 22b extends diagonally upward toward the left side from a left end of the flat plate part 22a. The right protruding part 22b extends diagonally upward toward the right side from a right end of the flat plate part 22a. The buckle receptacles 24 are arranged at a right lower portion of the flat plate part 22a, at a left lower portion of the flat plate part 22a, and at the two protruding parts 22b. The left assisting part 26 extends diagonally upward toward the left side from the left protruding part 22b. The right assisting part 26 extends diagonally upward toward the right side from the right protruding part 22b. Alternatively, the assisting parts 26 may extend parallel to the up-down direction. A size in a width direction of each assisting part 26 (direction perpendicular to a longitudinal direction of the assisting part 26) is smaller than a size in the width direction of each protruding part 22b. Also, a thickness of each assisting part 26 is smaller than a thickness of each protruding part 22b.

The backplate 12 comprises a device mount part 28 and two buckle receptacles 30. The device mount part 28 is configured to detachably receive the backpack-type device 4 (see FIG. 1).

Figure 4:
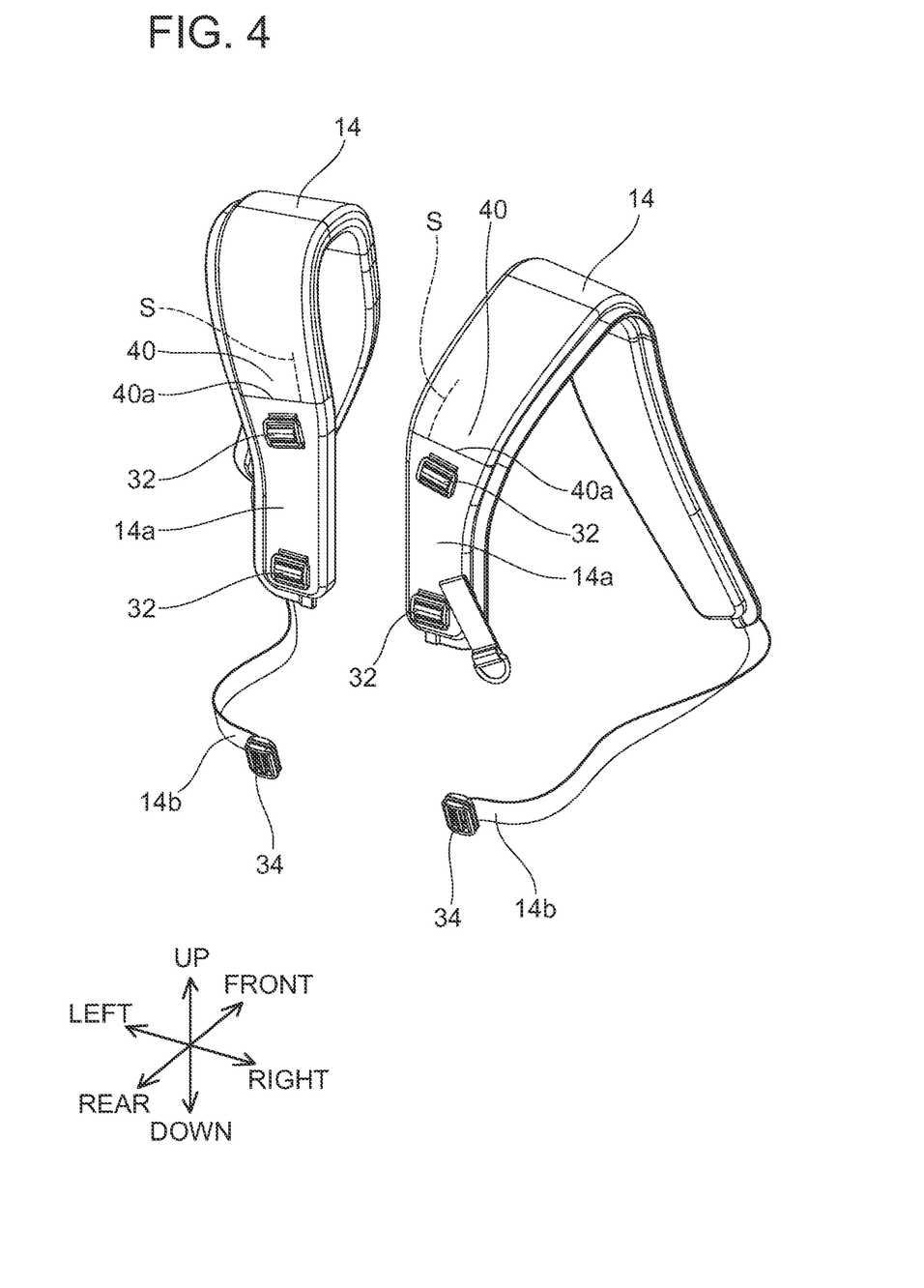
FIG. 4 illustrates a perspective view of shoulder belts 14 according to the embodiment as seen from the rear right upper side.

The shoulder belts 14 in FIG. 4 are configured to be worn on a user's shoulders. Two buckles 32 are arranged on one end 14a of each shoulder belt 14, and a buckle 34 is arranged on another end 14b of each shoulder belt 14. The buckles 32 arranged on the one end 14a of each shoulder belt 14 are attached to the corresponding buckle receptacles 24 (see FIG. 3) of the mount plate 10. The buckle 34 arranged on the other end 14b of each shoulder belt 14 is attached to the corresponding buckle receptacle 30 (see FIG. 3) of the backplate 12. The waist belt 16 in FIG. 2 is configured to be worn on a waist of the user. The waist belt 16 is attached to a lower portion of the front surface of the backplate 12 by screws. When the shoulder belts 14 are worn on the user's shoulders, the backpack assembly 6 is worn on the user's back, and when the waist belt 16 is worn on the user's waist, a state of the work apparatus 2 becomes stable.

Figure 5:
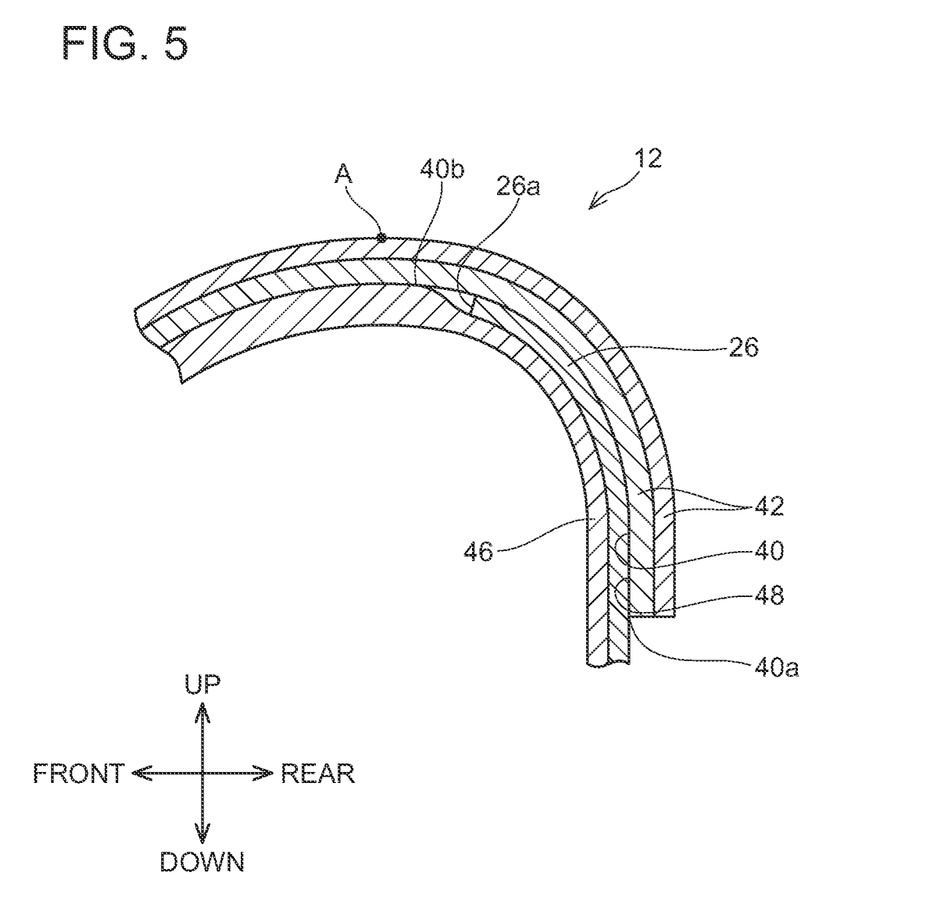
FIG. 5 illustrates a cross-sectional view of a pocket 40 in a state where the work apparatus 2 according to the embodiment is worn on a user's back.

A pocket 40 configured to have the corresponding assisting part 26 inserted therein is arranged on each of the shoulder belts 14. The pockets 40 are positioned above the corresponding buckles 32 in a state where the one ends 14a of the shoulder belts 14 are attached to the mount plate 10. As shown in FIG. 5, each pocket 40 extends along a longitudinal direction of the shoulder belts 14. Along a longitudinal direction of each pocket 40, an opening 48 is defined at an end 40a closer to the buckle 32, and an end 40b opposite to the buckle 32-side end 40a is closed. Specifically, the end 40b of the pocket 40 is closed at a position on a rear side of an apex A. The apex A is a highest point in each shoulder belt 14 in the state where the backpack assembly 6 is worn on the user's back. Each of the assisting parts 26 positioned in the pockets 40 elastically deforms along with a shape of the pockets 40 in a state where the shoulder belts 14 are worn on the user's shoulders. In such a state, an end 26a of the assisting part 26 in each pocket 40 is positioned on the rear side of the apex A. Each pocket 40 is defined by an upper-side cover 42 and a lower-side cover 46. The upper-side cover 42 is constituted of a double-layered cover material. That is, an upper surface side of each pocket 40 is covered by two layers. The upper-side cover 42 is sewn with the lower-side cover 46 at a right end, left end, and end 40b of the upper-side cover 42.

As shown in FIG. 1, a seam S for reducing a size of each pocket 40 in a width direction (direction perpendicular to a longitudinal direction of each shoulder belt 14) is disposed on each of the shoulder belts 14. The seam S extends inward of the pocket 40 (along the longitudinal direction of the shoulder belts 14) from the opening 48 (see FIG. 5) of each pocket 40. The seam S is formed by the upper-side cover 42 being sewn with the lower-side cover 46. In the present embodiment, the seam S is formed before the assisting part 26 is inserted into each pocket 40. In a modification, the seam S may be formed with the assisting part 26 being inserted in each pocket 40.

Figure 6:
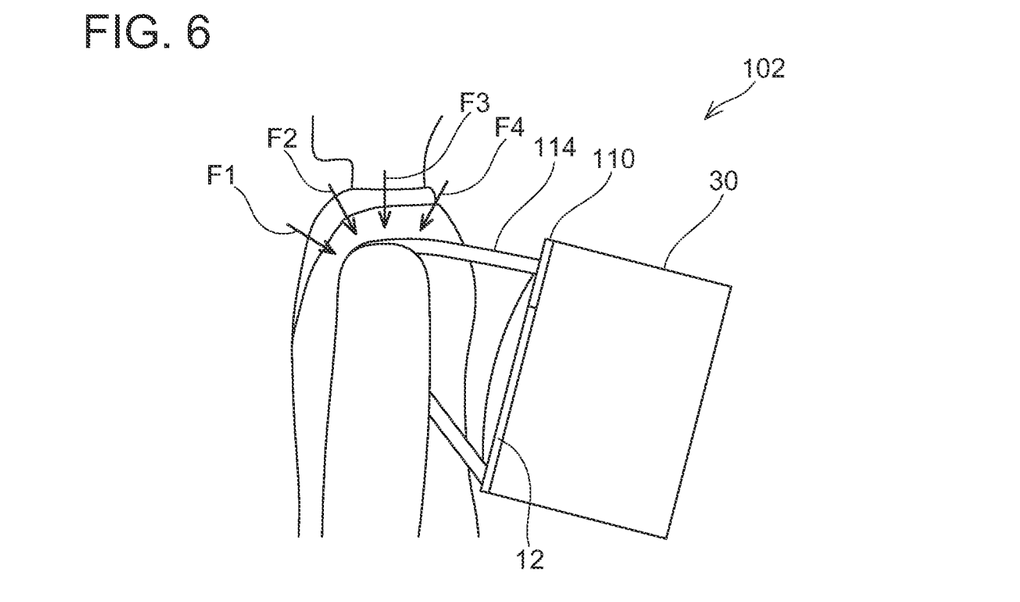
FIG. 6 illustrates a left view of a work apparatus 102 according to a comparative example in a state being worn by a user.
Figure 7:
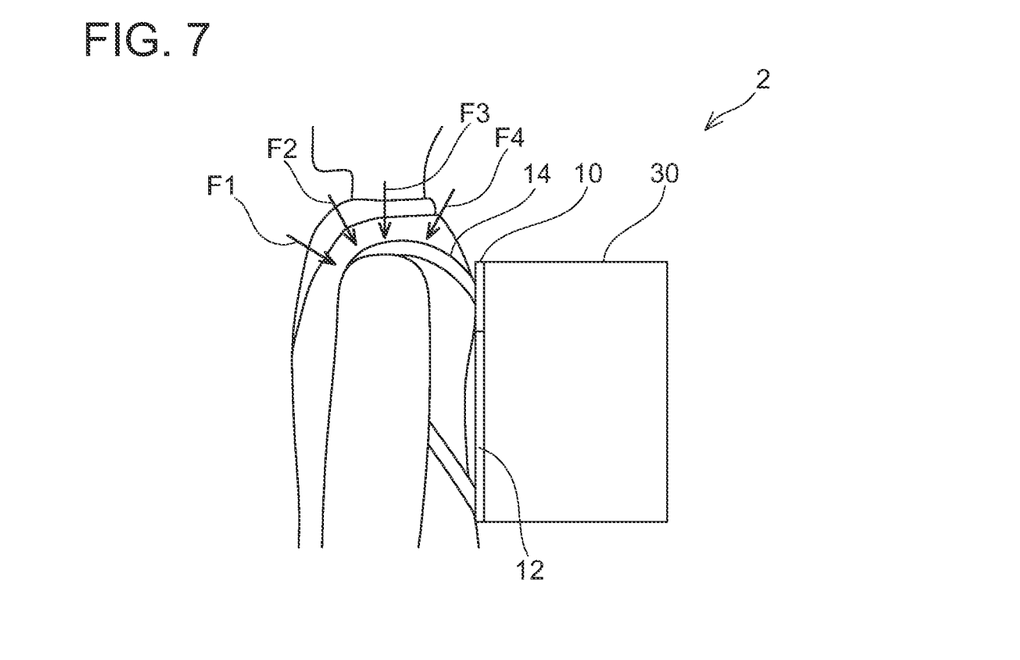
FIG. 7 illustrates a left view of the work apparatus 2 according to the embodiment in a state being worn by a user.
Figure 8:
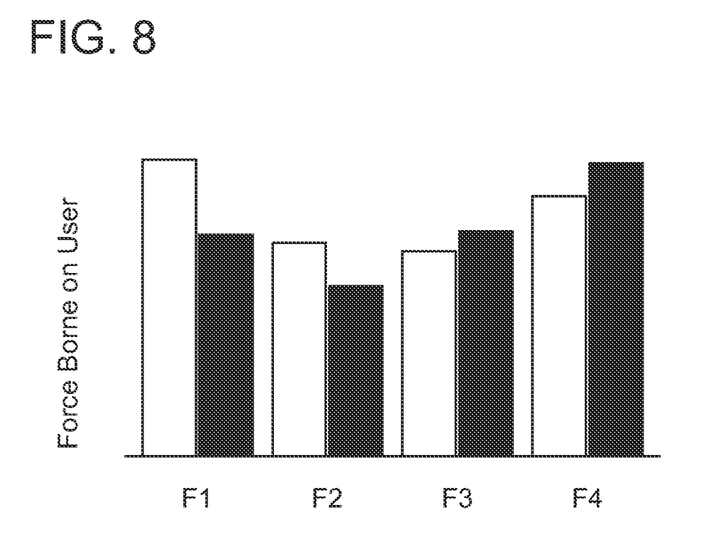
FIG. 8 illustrates a diagram for comparing a force borne on a user in a state where the work apparatus 102 according to the comparative example is worn on the user's back and a force borne on the user in a state where the work apparatus 2 according to the embodiment is worn on the user's back.

With reference to FIGS. 6 to 8, a force borne on the user when a work apparatus 102 according to a comparative example is worn on the user's back and a force on the user when the work apparatus 2 according to the embodiment is worn on the user's back will be described. The work apparatus 102 according to the comparative example in FIG. 6 differs from the work apparatus 2 according to the present embodiment in that its mount plate 110 does not have the assisting parts 26, and its shoulder belts 114 do not have the pockets 40. In FIG. 8, magnitude of the force borne on the user when the work apparatus 102 of the comparative example is worn on the user's back is indicated in black-contoured white squares, and magnitude of the force borne on the user when the work apparatus 2 of the present embodiment is worn on the user's back is indicated in black squares.

As shown in FIG. 6, when the work apparatus 102 of the comparative example is worn on the user's back, since the shoulder belts 114 do not stretch upward relative to the mount plate 110 and a backplate 112, the shoulder belts 114 strapped on the user's shoulders are displaced rearward. In this case, the mount plate 110 and the backplate 112 are inclined relative to the user in such a manner that upper portions of the mount plate 110 and the backplate 112 are detached from the user's back. Forces F1 and F2 are borne on the front portions (near collarbones) of the user's shoulders in such a situation, and also a force F3 is borne on the user's shoulders and a force F4 is borne on rear portions of the user's shoulders.

When the work apparatus 2 of the embodiment is worn on the user's back as shown in FIG. 7, the shoulder belts 14 bend along with the user's shoulders, as a result of which an upper portion of the backplate 12 enters a state of being pulled toward the user's back. Due to this, the mount plate 10 and the backplate 12 are not inclined relative to the user. In this case, the backplate 12 is maintained in a state in close contact with the user's back. Even in such a situation, the forces F1 and F2 are borne on the front portions of the user's shoulders (near collarbones), the force F3 is borne on the upper portions of the user's shoulders and the force F4 is borne on the rear portions of the user's shoulders. As shown in FIG. 8, however, in the state where the work apparatus 2 of the embodiment is worn on the user's back, the forces F1 and F2 borne on the front portions of the user's shoulders are smaller than the forces F1 and F2 in the case where the work apparatus 102 of the comparative example is worn on the user's back.

In one or more embodiments, as shown in FIG. 1, the backpack assembly 6 comprises: the backplate 12 extending in the up-down direction; the assisting parts 26 (example of an elastic member) fixed on the backplate 12 and configured to stretch in the up-down direction; and the shoulder belts 14 each of which includes the pocket 40 (example of an accommodating part). Each of the pockets 40 includes the opening 48 for inserting one of the assisting parts 26 and accommodates a portion of the assisting part 26.

In the above-mentioned backpack assembly 6, when the backpack assembly 6 is worn on the user's back, the shoulder belts 14 bend along the shoulders of the user, and also the upper portion of the backplate 12 enters a state of being pulled toward the back of the user. In this case, the backplate 12 is maintained in the state in close contact with the user's back. Due to this, a situation in which the upper portion of the backplate 12 separates from the user's back and thereby a great force is borne on the front portions of the user's shoulders can be suppressed from occurring. Accordingly, burden on the user when he/she is wearing the backpack assembly 6 can be reduced.

In one or more embodiments, as shown in FIG. 5, each of the pockets 40 includes the upper-side cover 42 and the lower-side cover 46. Each pocket 40 is defined by the upper-side cover 42 being coupled with the lower-side cover 46 at the right end (example of a first end) of the pocket 40 and the left end (example of a second end) of the pocket 40. As shown in FIG. 1, each pocket 40 further comprises the seam S (example of a coupling part) coupling the upper-side cover 42 and the lower-side cover 46 at the opening 48-side end 40a (example of a third end) of the pocket 40, in which the seam S is disposed between the right end and the left end. The right assisting part 26 is disposed between the right end of the corresponding pocket 40 and the seam S whereas the left assisting part 26 is disposed between the left end of the corresponding pocket 40 and the seam S.

According to the above configuration, a size of each opening 48 in the width direction can be made small as compared to the configuration in which each pocket 40 does not have the seam S. By making the size of each opening 48 in the width direction smaller, the assisting part(s) 26 can be suppressed from slipping from the shoulder belt(s) 14.

In one or more embodiments, as shown in FIG. 5, each of the pockets 40 includes the upper-side cover 42 and the lower-side cover 46. Each pocket 40 is defined by the upper-side cover 42 being coupled with the lower-side cover 46 at the right end (example of a first end) of the pocket 40 and the left end (example of a second end) of the pocket 40. The upper-side cover 42 is constituted of a double-layered cover material.

When the backpack assembly 6 is worn on the user's back, the shoulder belts 14 and the assisting parts 26 bend along the shoulders of the user. In such a state, a restoring force of the assisting parts 26 is borne on the upper-side covers 42. According to the above configuration, durability of the upper-side covers 42 can be improved.

In one or more embodiments, each of the pockets 40 includes the upper-side cover 42 and the lower-side cover 46. Each pocket 40 is defined by the upper-side cover 42 being coupled with the lower-side cover 46 at the right end (example of a first end) of the pocket 40, the left end (example of a second end) of the pocket 40, and the end 40*b* (example of a fourth end) opposite to the opening 48-side end 40*a* (example of a third end) of the pocket 40.

According to the above configuration, as compared to a configuration that the upper-side cover 42 is not coupled to the lower-side cover 46 at the end 40*b*, the upper portion of the backplate 12 enters the state of being pulled toward the back of the user at a greater degree. Accordingly, burden on the user when wearing the backpack assembly 6 on the back can be reduced at a greater degree.

In one or more embodiments, the backplate 12 and the assisting part 26 are constituted of different materials.

According to the above configuration, the backplate 12 can be constituted of a material having higher rigidity than the assisting parts 26. Due to this, rigidity of the backplate 12 can be improved.

In one or more embodiments, as shown in FIG. 1, the backpack-type device 4 is detachably attached to the backpack assembly 6. The backpack-type device 4 is a backpack-type power supply.

The backpack-type power supply is heavy. For example, the weight of the backpack-type power supply is approximately 10 kg. Due to this, the force borne on the front portions of the user's shoulders is relatively great. According to the above configuration, an advantage is achieved in suppressing a great force from being borne on the front portions of the user's shoulders.

(Modification 1) The "backpack-type device" may not be limited to the backpack-type power supply but may be a backpack-type power work machine. The power work machine may be for example a blower, a mist blower, a dust collector, a lawn mower, and a sprayer. Furthermore, the power work machine may be a power work machine having an engine, or a power work machine having a motor.

(Modification 2) The pocket(s) 40 of the shoulder belt(s) 14 may not have the seam S formed thereon.

(Modification 3) The "coupling part" may not be limited to the seam S, but may be a rivet, clip, or a hook, for example.

(Modification 4) The work apparatus may comprise an accommodating part having an opening defined at an end closer to the buckle 32 and at an end opposite to the buckle 32-side end of the accommodating part, instead of the pocket 40. That is, the upper-side cover 42 may not be coupled to the lower-side cover 46 at the end opposite to the buckle 32-side end.

(Modification 5) The assisting parts 26 and the backplate 12 may be constituted of a same material. In the present modification, the backplate 12 is constituted of a resin material such as high-density polyethylene (HDPE).

(Modification 6) Although in the embodiment the mount plate 10 comprises the assisting parts 26, the mount plate 10 and the assisting part 26 may be separate parts from each other. For example, the assisting parts 26 may be fixed to the mount plate 10.

(Modification 7) The backpack-type device may comprise a backplate and assisting part(s). For example, a rear wall of a housing of the backpack-type device may constitute "backplate" and the assisting part(s) may be fixed to such "backplate".

What is claimed is:

1. A backpack assembly, comprising:
a backplate extending in an up-down direction;
an elastic member fixed on the backplate and configured to stretch in the up-down direction; and
a shoulder belt including an accommodating part,
wherein the accommodating part includes an opening for inserting the elastic member and accommodates a portion of the elastic member,
wherein
the accommodating part includes an upper-side cover and a lower-side cover,
the accommodating part is defined by the upper-side cover being coupled with the lower-side cover at a first end in a width direction of the accommodating part and a second end in the width direction of the accommodating part, wherein the second end is disposed opposite to the first end,
the accommodating part further comprises a coupling part coupling the upper-side cover and the lower-side cover,
wherein the coupling part extends from the opening of the accommodating part in an inward direction of the accommodating part, and in only part of the accommodating part, between the first end and the second end in the width direction of the accommodating part, and along a longitudinal direction of the shoulder belt, and
the elastic member is disposed between the first end and the coupling part or between the second end and the coupling part.

2. The backpack assembly according to claim 1, wherein the upper-side cover is constituted of a double-layered cover.

3. The backpack assembly according to claim 1, wherein the accommodating part is additionally defined by an intermediate portion between one end of the shoulder belt and another end of the shoulder belt in an extending direction of the shoulder belt.

4. The backpack assembly according to claim 1, wherein the backplate and the elastic member are constituted of different materials.

5. The backpack assembly according to claim 1, wherein a backpack-type device is detachably attached to the backplate, and
the backpack-type device is a backpack-type power supply.

6. A backpack assembly, comprising:
a backplate extending in an up-down direction;
an elastic member fixed on the backplate and configured to stretch in the up-down direction; and
a shoulder belt including an accommodating part,
wherein the accommodating part includes an opening for inserting the elastic member and accommodates a portion of the elastic member,
wherein the accommodating part includes an upper-side cover and a lower-side cover,
the accommodating part is defined by the upper-side cover being coupled with the lower-side cover at a first end in a width direction of the accommodating part, and a second end in the width direction of the accommodating part, wherein the second end is disposed opposite to the first end,
the accommodating part is additionally defined by an intermediate portion between one end of the shoulder belt and another end of the shoulder belt in an extending direction of the shoulder belt,
the accommodating part further comprises a coupling part coupling the upper-side cover and the lower-side cover,
wherein the coupling part extends from the opening of the accommodating part in an inward direction of the accommodating part, and in only part of the accommodating part, between the first end and the second end in the width direction of the accommodating part, and along a longitudinal direction of the shoulder belt, and the elastic member is disposed between the first end and the coupling part or between the second end and the coupling part, wherein the upper-side cover is constituted of a double-layered cover, wherein the backplate and the elastic member are constituted of different materials, wherein a backpack-type device is detachably attached to the backplate, and the backpack-type device is a backpack-type power supply.

7. The backpack assembly according to claim 1, wherein the coupling part is a seam formed by the upper-side cover being sewn with the lower-side cover.

8. The backpack assembly according to claim 6, wherein the coupling part is a seam formed by the upper-side cover being sewn with the lower-side cover.

* * * * *